United States Patent

Shimada

(10) Patent No.: US 11,233,256 B2
(45) Date of Patent: Jan. 25, 2022

(54) POWER SUPPLY SYSTEM AND CONTROL METHOD THEREFOR

(71) Applicant: NISSAN MOTOR CO., LTD., Yokohama (JP)

(72) Inventor: Kazuhide Shimada, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 74 days.

(21) Appl. No.: 16/634,954

(22) PCT Filed: Jul. 31, 2017

(86) PCT No.: PCT/JP2017/027759
§ 371 (c)(1),
(2) Date: Jan. 29, 2020

(87) PCT Pub. No.: WO2019/026148
PCT Pub. Date: Feb. 7, 2019

(65) Prior Publication Data
US 2020/0220184 A1    Jul. 9, 2020

(51) Int. Cl.
H01M 8/0432 (2016.01)
B60L 50/75 (2019.01)
H01M 8/04007 (2016.01)
H01M 8/04701 (2016.01)

(52) U.S. Cl.
CPC ......... H01M 8/04373 (2013.01); B60L 50/75 (2019.02); H01M 8/04067 (2013.01); H01M 8/04708 (2013.01); H01M 2250/20 (2013.01)

(58) Field of Classification Search
CPC ............... B60L 1/003; B60L 2240/545; B60L 2240/547; B60L 2240/549; B60L 50/75; B60L 58/13; B60L 58/25; B60L 58/31; B60L 58/40; H01M 10/486; H01M 2250/20; H01M 8/04037; H01M 8/04067; H01M 8/04373; H01M 8/04708; H01M 8/12
See application file for complete search history.

(56) References Cited

U.S. PATENT DOCUMENTS 6,132,902 A    10/2000  Miyasaka
2006/0088738 A1*  4/2006  Aso .................. H01M 10/6563
                                                    429/9
(Continued)

FOREIGN PATENT DOCUMENTS

JP    10-117406 A      5/1998
JP    2004-288530 A   10/2004
(Continued)

Primary Examiner — Adam A Arciero
(74) Attorney, Agent, or Firm — Foley & Lardner LLP

(57) ABSTRACT

An electric power supply system 100 comprises a battery 10 that generates heat by discharging an electric power, and a fuel cell system 20 that generates the electric power by fuel cells 21. The electric power supply system 100 supplies power to an electric load. The electric power supply system 100 determines whether or not a temperature of the battery 10 is equal to or less than a predetermined temperature, and when the temperature of the battery is equal to or less than the predetermined temperature, the electric power supply system 100 discharges the battery 10 to the fuel cell system 20.

7 Claims, 10 Drawing Sheets

(56) References Cited

U.S. PATENT DOCUMENTS

| | | | | |
|---|---|---|---|---|
| 2008/0248351 A1* | 10/2008 | Wake | ............... | H01M 8/04302 |
| | | | | 429/413 |
| 2012/0053766 A1 | 3/2012 | Ham et al. | | |
| 2014/0335433 A1* | 11/2014 | Jomori | .............. | H01M 8/04238 |
| | | | | 429/432 |
| 2018/0375135 A1 | 12/2018 | Kumada et al. | | |

FOREIGN PATENT DOCUMENTS

| | | | |
|---|---|---|---|
| JP | 2009-118729 A | | 5/2009 |
| JP | 2011008988 A | * | 1/2011 |
| JP | 2012-214142 A | | 11/2012 |
| WO | WO-2004/102720 A1 | | 11/2004 |
| WO | WO-2017/110390 A1 | | 6/2017 |

* cited by examiner

POWER SUPPLY SYSTEM AND CONTROL METHOD THEREFOR

TECHNICAL FIELD

The present invention relates to a power supply system for discharging a battery in accordance with a temperature of the battery and a control method therefor.

BACKGROUND ART

JP 2012-214142 A discloses a technique for increasing temperature of two batteries mounted on a vehicle at a low temperature, by mutually performing charge and discharge of the batteries so that heat is generated within the batteries due to internal resistors of the batteries.

SUMMARY OF INVENTION

In an electric power supply system comprising two batteries as described above, warming-up of the batteries is performed efficiently. However, if either of the batteries is replaced with fuel cells, a problem will raise because it is not possible to mutually perform charge and discharge between the battery and the fuel cells.

In consideration of such a problem, the present invention has an object to provide an electric power supply system with efficiently improved output characteristics of a battery and a control method therefor.

According to an aspect of the present invention, a control method for a power supply system that supplies an electric power to an electric load is provided. The system comprises a battery that generates heat by discharging the electric power, and a fuel cell system that generates the electric power by fuel cells. The method comprises a temperature determining step of determining whether or not a temperature of the battery is equal to or less than a predetermined temperature and a discharging step of discharging the battery to the fuel cell system when the temperature of the battery is determined to be equal to or less than the predetermined temperature.

The details as well as other features and advantages of this invention are set forth in the remainder of the specification and are shown in the accompanying drawings.

DESCRIPTION OF EMBODIMENTS

The embodiments of the present invention will be described with reference to the attached drawings.

First Embodiment

Figure 1:
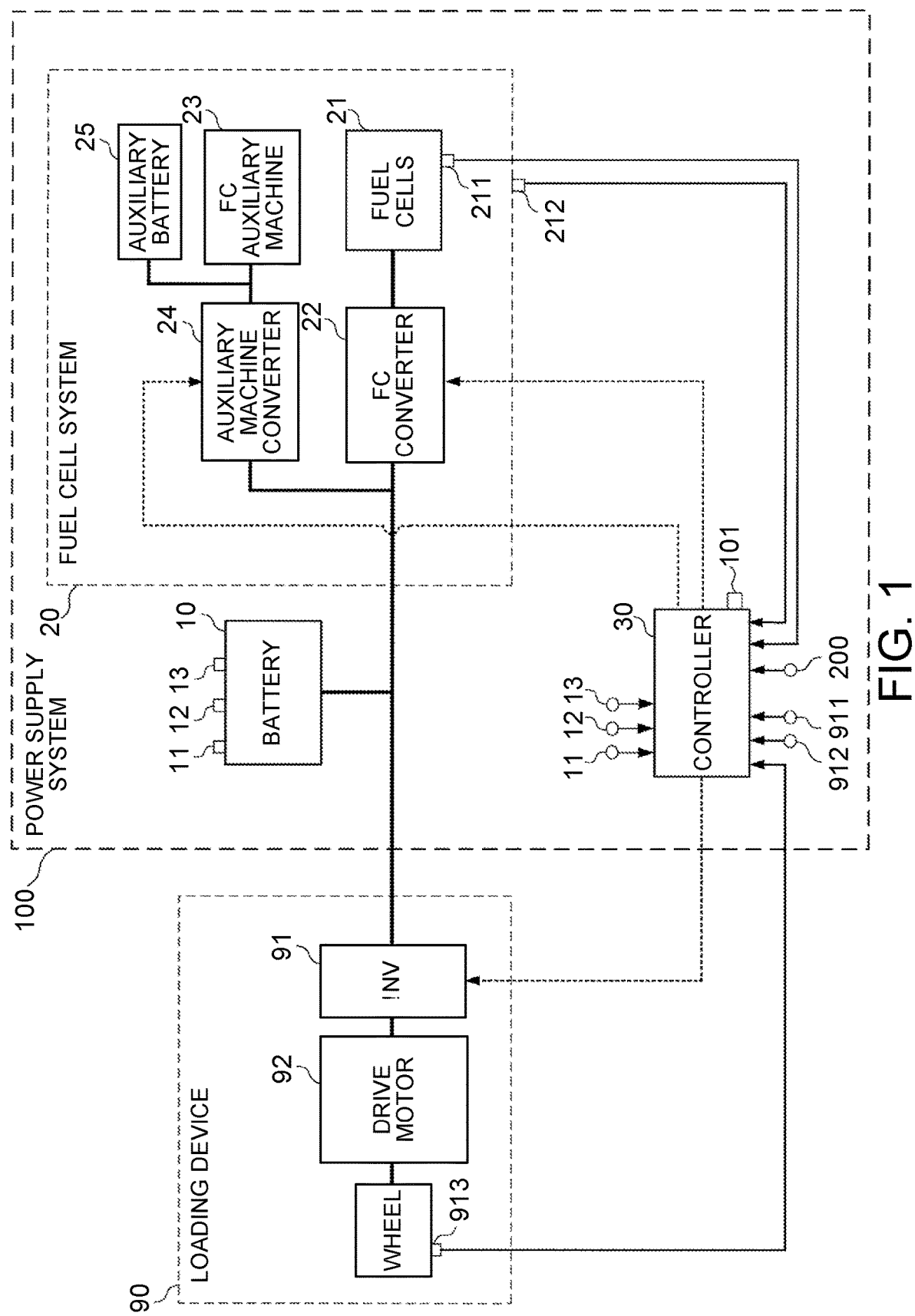
FIG. 1 is a block diagram illustrating a configuration of an electric power supply system according to a first embodiment of the present invention.

FIG. 1 shows an electric power supply system 100 according to a first embodiment of the present invention.

The electric power supply system 100 is configured to supply an electric power to an electric load device 90 provided in a movable body such as a vehicle, an airplane, or a vessel, for example.

The electric power supply system 100 in the present embodiment is provided in a vehicle such as an electric vehicle including a hybrid vehicle or a train. The vehicle is provided with an accelerator sensor 911 that detects an operation amount of an accelerator pedal by a driver of the vehicle, a brake sensor 912 that detects an operation amount of a brake pedal by the driver, and a vehicle speed sensor 913 that detects a running speed of the vehicle.

The electric load device 90 is an operation device that operates by the electric power supplied from the electric power supply system 100. The electric load device 90 according to the present embodiment includes an electric motor 92 that drives the vehicle, and an inverter 91 that converts an output power of the electric power supply system 100 into an alternating-current power and supplies it to the electric motor 92.

The electric power supply system 100 includes a battery 10, a fuel cell system 20, and a controller 30. The electric power supply system 100 is a hybrid power supply system that supplies power to the electric load device 90 from at least one power supply out of the battery 10 and the fuel cell system 20.

The electric power supply system 100 according to the present embodiment is provided with an FC operation button 200 by which the driver selects start or stop of the fuel cell system 20, and an outside temperature sensor 101 connected to the controller 30 so as to detect an outside ambient temperature.

The battery 10 is mainly used for electric power supply to the electric load device 90. The battery 10 is connected to both the fuel cell system 20 and the electric load device 90. The battery 10 is in the form of a lithium-ion battery, a lead battery, or the like. For example, the battery 10 outputs several hundred volts (V) of direct-current power. The battery 10 is provided with a temperature sensor 11, a current sensor 12, and a voltage sensor 13.

The temperature sensor 11 detects a temperature of the battery 10. The temperature sensor 11 outputs a detection value to the controller 30.

The current sensor 12 detects an output current of the battery 10. The current sensor 12 outputs a detection value to the controller 30.

The voltage sensor 13 detects an output voltage of the battery 10. The voltage sensor 13 outputs a detection value to the controller 30.

The fuel cell system 20 is connected to both the battery 10 and the electric load device 90. The fuel cell system 20 operates such that fuel cells 21 generate the electric power. The fuel cell system 20 includes the fuel cells 21, an FC converter 22, an FC auxiliary machine 23, an auxiliary machine converter 24, and an auxiliary battery 25.

The fuel cells 21 are connected to the FC converter 22. The fuel cells 21 generate the electric power upon receipt of supply of fuel gas and oxidant gas. They may be solid oxide fuel cells, polymer electrolyte fuel cells, or the like. The fuel cells 21 of the present embodiment are constituted by solid oxide fuel cells.

The fuel cells 21 can supply the electric power to at least one of the battery 10 and the inverter 91. The fuel cells 21 are configured such that a plurality of cells is laminated, and the fuel cells 21 output a voltage having a magnitude different from an output voltage of the battery 10.

For example, the fuel cells 21 output a direct-current voltage of several dozen volts that is lower than the output voltage value of the battery 10. In such a configuration, the fuel cells 21 are used as an auxiliary power supply for supplementing an output power of the battery 10. Such a power supply system has a function to extend the output range of the battery 10, and therefore, the electric power supply system 100 is called a range extender. The fuel cells 21 are provided with an FC temperature sensor 211, and the fuel cell system 20 is provided with a fuel residual amount sensor 212.

The FC temperature sensor 211 detects a temperature of the fuel cells 21. The FC temperature sensor 211 detects, for example, the temperature of the fuel cells 21, a temperature of oxidant gas supplied to the fuel cells 21, or a temperature of oxidant gas discharged from the fuel cells 21. The FC temperature sensor 211 outputs a detection value to the controller 30.

The fuel residual amount sensor 212 detects a residual amount of fuel supplied to the fuel cells 21. The fuel residual amount sensor 212 outputs a detection value to the controller 30.

The FC converter 22 is a voltage converter placed between the battery 10 and the fuel cells 21. The FC converter 22 converts a voltage value of the electric power input from the fuel cells 21 into a different voltage value and outputs it. For example, the FC converter 22 is constituted by a DC/DC converter that boosts or decreases an input primary-side voltage and outputs a secondary-side voltage.

The FC auxiliary machine 23 is connected to the auxiliary machine converter 24. The FC auxiliary machine 23 is an additional apparatus necessary for power generation of the fuel cells 21. The FC auxiliary machine 23 is, for example, a heater for warming the fuel cells 21, an actuator for supplying oxidant gas or fuel gas to the fuel cells 21, an actuator for circulating refrigerant to the fuel cells 21, or the like.

One example of the actuator constituting the FC auxiliary machine 23 is a blower or a compressor for supplying air from atmosphere to the fuel cells 21 as oxidant gas.

The auxiliary machine converter 24 is a voltage translator placed between the FC converter 22 and the battery 10. The auxiliary machine converter 24 supplies an output power from at least either of the battery 10 and the fuel cells 21 to the FC auxiliary machine 23. For example, the auxiliary machine converter 24 is achieved by a DC/DC converter for converting a voltage between the FC converter 22 and the battery 10 to a voltage value within an operating voltage range of the FC auxiliary machine 23.

The auxiliary battery 25 is placed between the auxiliary machine converter 24 and the FC auxiliary machine 23. The auxiliary battery 25 supplies electric power to the FC auxiliary machine 23. For example, the auxiliary battery 25 supplies electric power to the FC auxiliary machine 23 when electric power cannot be supplied from any of the battery 10 and the fuel cells 21. The auxiliary battery 25 is constituted by a lead battery of several dozen volts, for example.

The controller 30 is constituted by one or more microcomputers including a central processing unit (CPU) in which a predetermined process is programed and a storage device. The controller 30 is a control device that controls the operation of the electric power supply system 100.

The controller 30 acquires detection values output from the temperature sensor 11, the current sensor 12, the voltage sensor 13, the FC temperature sensor 211, the fuel residual amount sensor 212, the accelerator sensor 911, the brake sensor 912, and the vehicle speed sensor 913. The controller 30 controls respective operations of the FC converter 22, the auxiliary machine converter 24, and the inverter 91 in accordance with the detection values thus acquired.

For example, the controller 30 acquires a required torque of the electric motor 92 by use of the detection value of the accelerator sensor 911 and calculates required power required to the electric power supply system 100 based on the required torque. The controller 30 controls the FC converter 22, the auxiliary machine converter 24, and the inverter 91 so that the required power thus calculated is supplied to the electric motor 92 from at least either one of the battery 10 and the fuel cells 21.

Further, the controller 30 calculates a charging amount of the battery 10 by use of the detection value of at least either one of the current sensor 12 and the voltage sensor 13 and starts to operate the fuel cell system 20 based on the magnitude of the charging amount.

A starting process of the fuel cell system 20 includes a warming-up process of increasing the temperature of the fuel cells 21 to an operation temperature suitable for electric power generation, and a process of supplying fuel gas and oxidant gas to the fuel cells 21 so that the fuel cells 21 enters a power-generatable state. For example, the controller 30 in the warming-up process warms up the fuel cells 21 by driving an anode effluent gas combustor (not shown), a heater, or the like so as to warm the oxidant gas supplied to the fuel cells 21. Alternatively, the controller 30 controls the FC converter 22 and the auxiliary machine converter 24 such that a self-heating amount of the fuel cells 21 is increased by increasing an output power from the fuel cells 21 to the FC auxiliary machine 23.

The controller 30 of the present embodiment calculates, as the charging amount of the battery 10, a state of charge (SOC) found from a general calculation technique such as current accumulation or voltage accumulation of the battery 10 based on the detection values of the current sensor 12 and the voltage sensor 13.

When the calculated SOC of the battery 10 is equal to or less than a predetermined FC start threshold the controller 30 controls the FC converter 22, the FC auxiliary machine 23, and the auxiliary machine converter 24 such that the fuel cell system 20 starts to operate.

In the meantime, when the battery SOC exceeds a predetermined FC stop threshold, the controller 30 stops operation of the fuel cell system 20. The FC stop threshold as used herein may be set to the same value as the aforementioned FC start threshold or may be set to a value different from the FC start threshold, e.g., a value larger or smaller than the FC start threshold.

Further, when the controller 30 receives a start operation signal to instruct operation start of the fuel cell system 20 from the FC operation button 200 at the time when the driver gets in a vehicle or while the driver is driving the vehicle, the controller 30 executes a starting process of the fuel cell system 20. The controller 30 controls operation of the auxiliary machine converter 24 such that electric power discharged from the battery 10 is supplied to the FC auxiliary machine 23.

Figure 2:
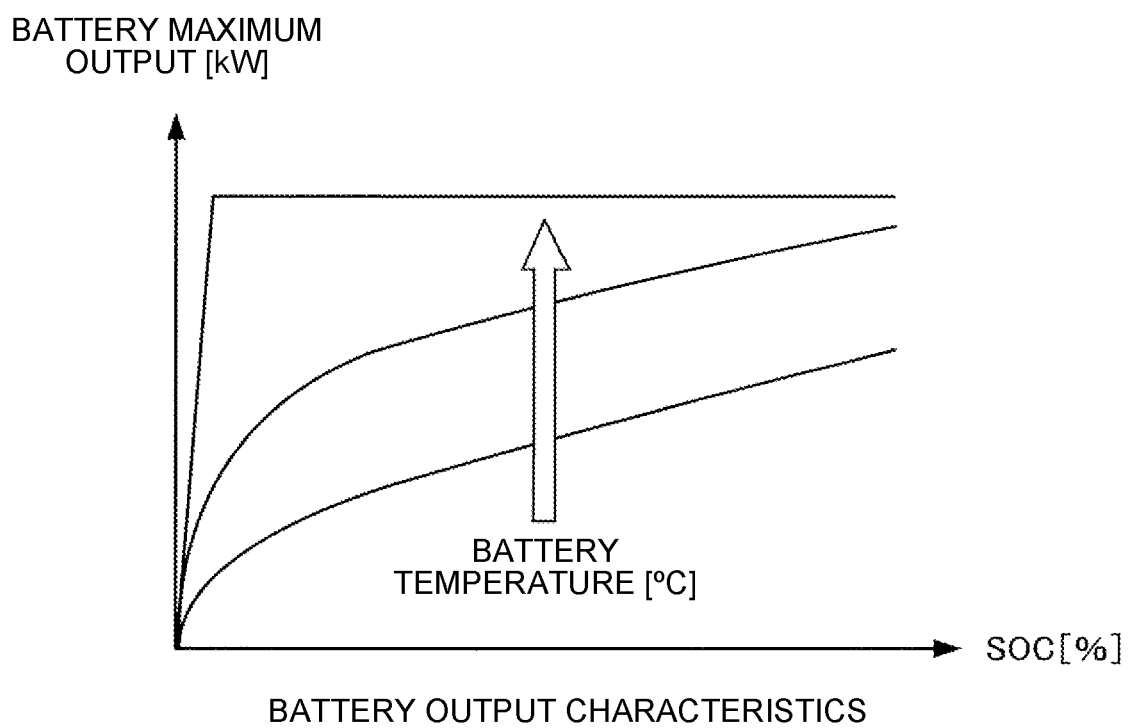
FIG. 2 is a diagram illustrating a relationship between a temperature of a battery and output characteristics of the battery.

FIG. 2 is a diagram illustrating a relationship between a maximum output of the battery 10 and the SOC of the battery 10 depending on the temperature of the battery 10. The maximum output of the battery 10 is a maximum value of discharge power of the battery 10.

As illustrated in FIG. 2, as the temperature of the battery 10 decreases, the output characteristics of the battery 10 worsen. For example, when the vehicle is started under a temperature environment below the freezing point, the temperature of the battery 10 is low, so that the output characteristics of the battery 10 worsen. Accordingly, when the temperature of the battery 10 is low, it is difficult to obtain the required electric power for driving of the electric load device 90 from the battery 10. It is therefore necessary to perform warming-up of the battery 10 at an early stage.

Figure 3:
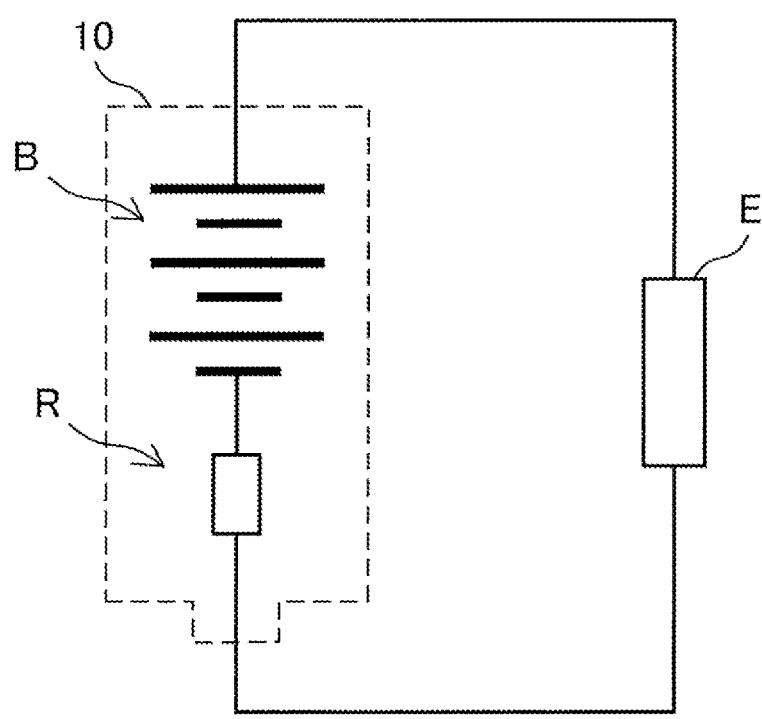
FIG. 3 is a diagram describing self-heating of the battery.

FIG. 3 is a circuit diagram to describe an equivalent circuit of the battery 10.

As illustrated in FIG. 3, the battery 10 has an internal resistor R associated with a battery body B. Accordingly, when the battery 10 discharges the electric power to an external device E, a discharge current flows through the internal resistor R. Accordingly, the internal resistor R generates heat, so that the battery 10 is heated. Similarly, in a case where the battery 10 is charged, a charge current flows through the internal resistor R. Accordingly, the internal resistor R generates heat, so that the battery 10 is heated.

In a case where the temperature of the battery 10 is below a rated output temperature necessary to secure a rated output of the battery 10, the warming-up of the battery 10 is promoted by way of charging or discharging the battery 10.

Figure 4:
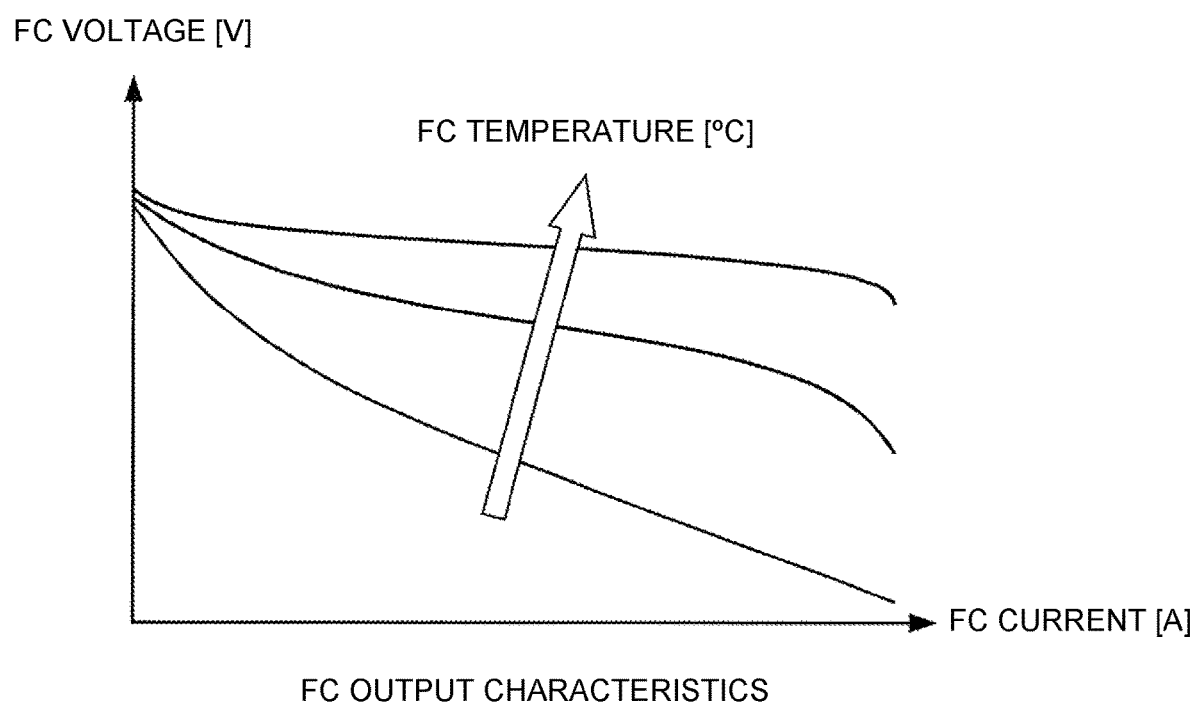
FIG. 4 is a diagram illustrating a relationship between a temperature of a fuel cell and output characteristics of the fuel cell.

FIG. 4 is a diagram illustrating a relationship between output characteristics of the voltage and the current of the fuel cells 21 depending on the temperature of the fuel cells 21.

As illustrated in FIG. 4, as the temperature of the fuel cells 21 decreases, the output characteristics of the fuel cells 21 worsen, similarly to the output characteristics of the battery 10. Particularly, in terms of the solid oxide fuel cells, a warming-up process of increasing the temperature of the fuel cells 21 to an operating temperature of several hundred degrees Centigrade is required. Accordingly, a longer time is required to complete the warming-up of the fuel cells 21. It is therefore preferable to start the fuel cell system 20 at an early stage to improve the response of the fuel cells 21.

Figure 5:
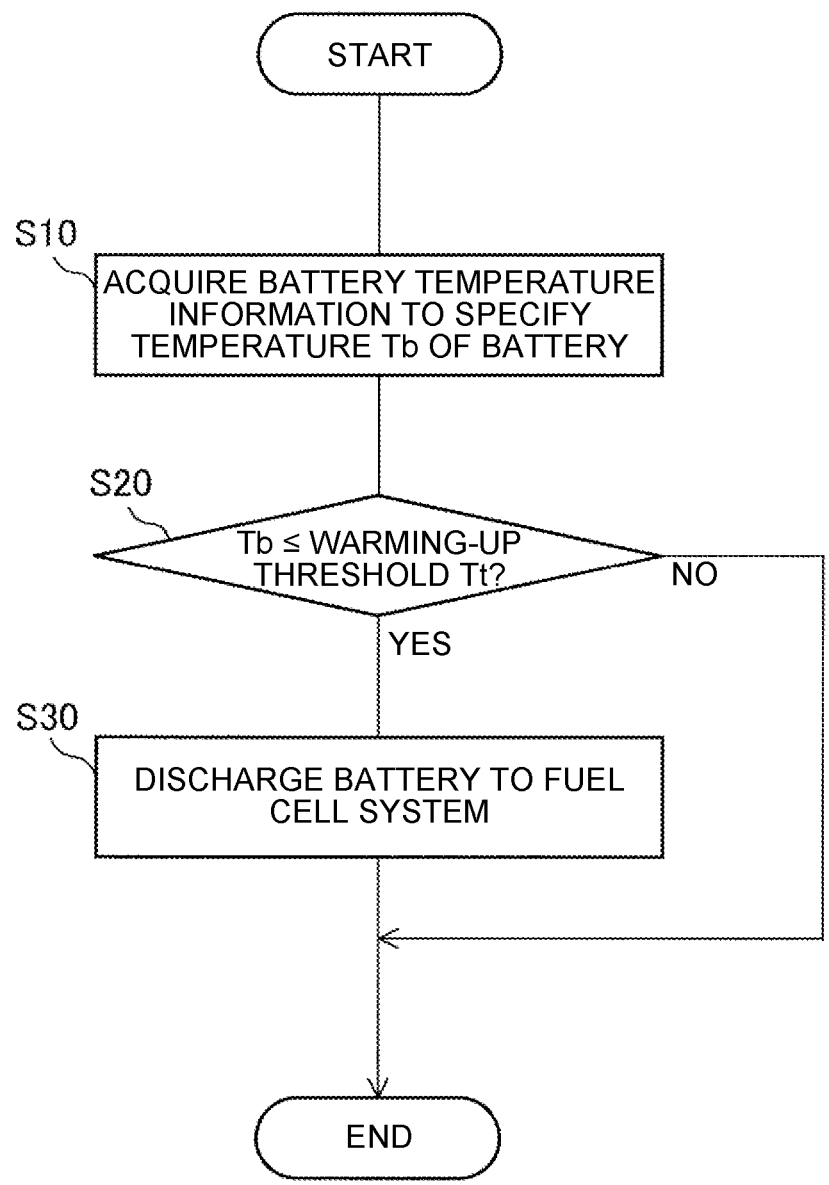
FIG. 5 is a flowchart illustrating a control process of the electric power supply system according to a first embodiment of the present embodiment.

FIG. 5 is a flowchart illustrating a process of controlling the electric power supply system 100 performed by the controller 30 according to the present embodiment.

In a step S10, the controller 30 acquires battery temperature information to specify a temperature Tb of the battery 10. For example, the controller 30 acquires the detection value of the temperature sensor 11 as the battery temperature information.

Alternatively, an output characteristic map indicative of the relationship between the output characteristics of the battery 10 and the temperature of the battery 10, as illustrated in FIG. 4, is stored in advance, and when a relationship between a voltage and a current of the battery 10 is found, the temperature Tb of the battery 10 can be estimated. For this purpose, the controller 30 may acquire respective detection values of the current sensor 12 and the voltage sensor 13 as the battery temperature information.

Alternatively, a heat generation amount map indicative of a relationship between a charging/discharging amount of the battery 10 and a heat generation amount of the battery 10 may be stored in the controller 30. If a detection value of the outside temperature sensor 101 at the time of starting of the battery 10 is considered as the temperature Tb of the battery 10, the temperature Tb of the battery 10 can be estimated.

The controller 30 may acquire the detection value of the outside temperature sensor 101 at the time of starting of the battery 10 and respective detection values of the current sensor 12 and the voltage sensor 13 after the starting as the battery temperature information. Instead of the respective detection values of the current sensor 12 and the voltage sensor 13, a change amount of the state of charge (SOC) of the battery 10 after the starting may be used.

In a step S20, the controller 30 determines whether or not the temperature Tb of the battery 10 that is specified by the battery temperature information is equal to or less than a warming-up threshold Tt. The warming-up threshold Tt is, for example, a value determined in advance based on the temperature of the battery 10 below which the battery 10 cannot discharge a sufficient electric power.

For example, in a case where the aforementioned output characteristic map is stored in the controller 30, the controller 30 acquires respective detection values of the current sensor 12 and the voltage sensor 13 as the battery temperature information and calculates discharge power of the battery 10 by use of the detection values thus acquired. When the controller 30 calculates the discharge power of the battery 10, the controller 30 refers to the output characteristic map and calculates a temperature associated with the discharge power as the temperature Tb of the battery 10. The calculated value or the detection value of the temperature Tb of the battery 10 is stored as the battery temperature information.

Thus, the controller 30 determines, based on the battery temperature information, whether or not temperature of the battery 10 is equal to or less than a predetermined temperature equal to the warming-up threshold Tt. When it is determined that the temperature Tb of the battery 10 exceeds the warming-up threshold Tt, the controller 30 finishes the processing of the control method for the electric power supply system 100.

When it is determined that the temperature Tb of the battery 10 is equal to or less than the warming-up threshold Tt, the controller 30 controls the operation of the auxiliary machine converter 24 in a step S30 such that the battery 10 discharges the electric power to the FC auxiliary machine 23 of the fuel cell system 20.

When the fuel cell system 20 does not operate at the time when it is determined that the temperature Tb of the battery 10 is equal to or less than the warming-up threshold Tt, the controller 30 starts the fuel cell system 20 to operate and causes the battery 10 to discharge the electric power to the FC auxiliary machine 23. In contrast, when the fuel cell system 20 has already started to operate, the electric power might be supplied from the fuel cells 21 to the FC auxiliary machine 23. In this case, the controller 30 controls the operations of the FC converter 22 and the auxiliary machine converter 24 such that power supply to the FC auxiliary machine 23 is switched from the output power of the fuel cells 21 to the output power of the battery 10.

When the process of the step S30 is finished, the processing of the control method for the electric power supply system 100 is terminated.

Thus, when the battery temperature information is equal to or less than the predetermined temperature equal to the warming-up threshold Tt, the controller 30 causes the battery 10 to discharge the electric power to the FC auxiliary machine 23 provided in the fuel cell system 20.

Figure 6:
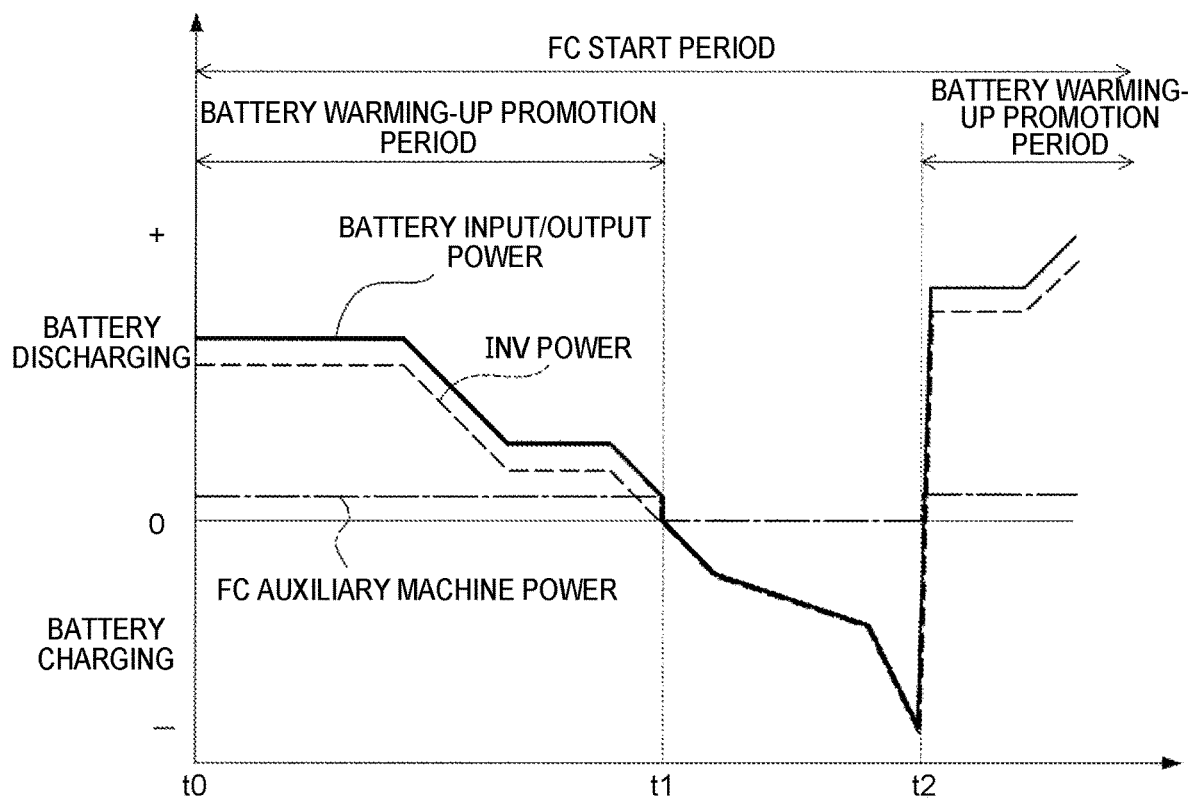
FIG. 6 is a timing chart illustrating a result of controlling charging of the battery connected to a fuel cell system.

FIG. 6 is a timing chart illustrating a result of controlling the battery 10 and the fuel cell system 20 when the temperature Tb of the battery 10 is lower than the warming-up threshold Tt.

The horizontal axis indicates time, and the vertical axis indicates charge power and discharge power of the battery 10. As the charge power or the discharge power of the battery 10 increases, a self-heating amount of the battery 10 increases, thereby promoting the warming-up of the battery 10.

INV power indicates power supplied from the battery 10 to the inverter 91, FC auxiliary machine power indicates power discharged from the battery 10 to the FC auxiliary machine 23, and battery input/output power indicates a total variation of the charge power and the discharge power in the battery 10.

Before a time t0, the controller 30 determines that the temperature Tb of the battery 10 is lower than the warming-up threshold Tt, and the controller 30 executes the starting process of the fuel cell system 20. When the driver steps on the accelerator pedal to accelerate the vehicle, the controller 30 supplies power to the electric motor 92 from the battery 10 through the inverter 91.

At the time t0, the temperature Tb of the battery 10 is lower than the warming-up threshold Tt. Accordingly, while the controller 30 controls the FC converter 22 and supplies power to the inverter 91 from the battery 10, the controller 30 controls the auxiliary machine converter 24 such that the battery 10 discharges the electric power also to the FC auxiliary machine 23.

Hereby, the FC auxiliary machine power is discharged from the battery 10 as well as the INV power, so that the output current of the battery 10 increases and the warming-up of the battery 10 is promoted. Further, since the output power of the battery 10 is also supplied to the FC auxiliary machine 23 of the fuel cell system 20, the power used in the starting process of the fuel cell system 20 is partially covered by the battery 10.

As a result, the electric power supply system 100 can improve the output characteristics of the battery 10 at an early stage and can execute the starting process of the fuel cell system 20 efficiently.

At a time t1, the driver releases a foot from the accelerator pedal to decelerate the vehicle, so that the battery 10 is charged with a regenerative power from the electric motor 92 through the inverter 91.

At this time, discharging of the FC auxiliary machine power by the battery 10 is not performed. This is because, when the operation of the auxiliary machine converter 24 is controlled such that the power of the battery 10 is discharged to the FC auxiliary machine 23, a charging timing of the battery 10 is delayed, so that the self-heating amount by the charging of the battery 10 becomes small. In this case, the electric power is supplied to the FC auxiliary machine 23 from at least either one of the auxiliary battery 25 and the fuel cells 21.

At a time t2, the driver steps on the accelerator pedal to accelerate the vehicle again, so that the FC auxiliary machine power is discharged from the battery 10 in addition to the INV power. Hereby, the output current of the battery 10 increases, and the self-heating amount increases, so that the warming-up of the battery 10 is promoted.

Since the battery 10 discharges the electric power to the fuel cell system 20 until the temperature Tb of the battery 10 reaches the warming-up threshold Tt, the fuel cell system 20 can be started efficiently while the warming-up of the battery 10 is promoted.

According to the first embodiment of the present invention, the electric power supply system 100 comprises the battery 10 configured to generate heat by discharging, and the fuel cell system 20 configured to cause the fuel cells 21 to generate the electric power. The electric power supply system 100 supplies power to the electric load device 90. The control method for the electric power supply system 100 includes the temperature determination step S20 of determining whether or not the temperature of the battery 10 is equal to or less than the warming-up threshold Tt, that is, whether or not the battery 10 is equal to or less than the predetermined temperature. Further, the control method for the electric power supply system 100 includes the discharging step S30 of causing the battery 10 to discharge the electric power to the fuel cell system 20 when it is determined that the battery 10 is equal to or less than the predetermined temperature.

When the temperature of the battery 10 is equal to or less than the predetermined temperature, not only the output characteristics of the battery 10 but also the output characteristics of the fuel cell system 20 might worsen, as illustrated in FIG. 2 and FIG. 4. As a solution of this problem, the battery 10 is caused to discharge the electric power to the fuel cell system 20. As a result, the output current flows through the internal resistor R of the battery 10, thereby promoting the warming-up of the battery 10. Further, since the battery 10 discharges the electric power to the fuel cell system 20, the fuel cell system 20 in a non-operation state can be started earlier, so that the output characteristics of the fuel cell system 20 can be recovered earlier.

Further, since the output power of the battery 10 is effectively used in the starting process of the fuel cell system 20, consumption of the generated power of the fuel cells 21 and the output power of the auxiliary battery 25 can be reduced just by the amount of the power discharged from the battery 10. This makes it possible to reduce the fuel or the power consumed by the fuel cell system 20. Accordingly, while the warming-up of both the battery 10 and the fuel cells 21 is promoted, it is possible to restrain an increase in energy loss in the fuel cell system 20.

Generally, in order to improve the output characteristics of the electric power supply system 100 earlier, a greater amount of the output electric power of the battery 10 and the fuel of the fuel cells 21 are consumed. According to the present embodiment, however, the output characteristics of the electric power supply system 100 are improved earlier, while suppressing the energy consumption required therefor.

Two effects, i.e., the early improvement of the output characteristics of the electric power supply system 100 and the suppression of a fuel consumption in the electric power supply system 100, which may be contradictory, can be achieved together. Accordingly, the present embodiment can efficiently improve the output characteristics of the battery 10.

Second Embodiment

Figure 7:
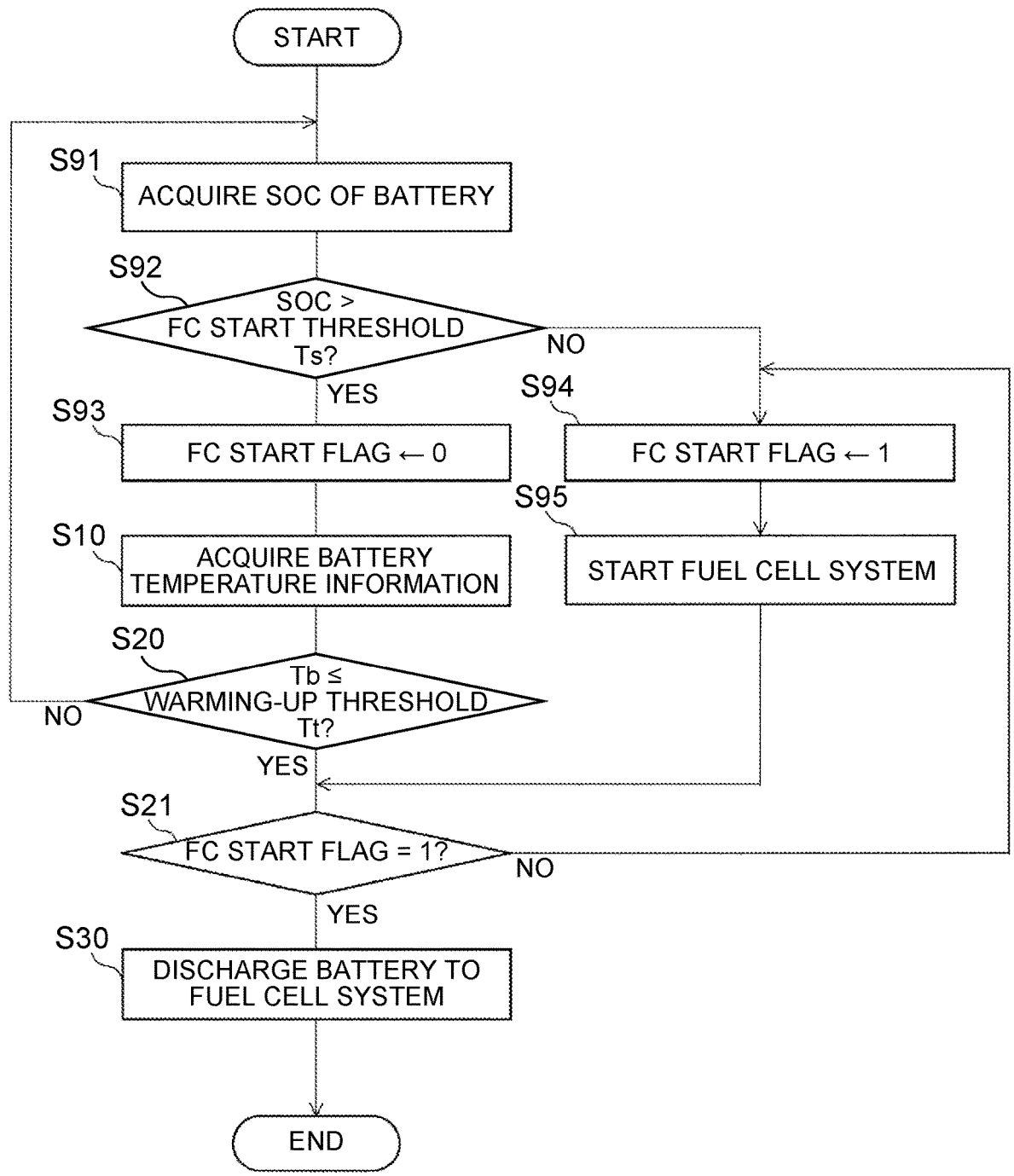
FIG. 7 is a flowchart illustrating a control process of the electric power supply system according to a second embodiment of the present invention.

FIG. 7 is a flowchart illustrating a control process of the electric power supply system according to the second embodiment of the present invention.

The control process according to the present embodiment includes a process of a step S21 and processes of steps S91 to S95 in addition to the processes from the steps S10 to S30, which have been described in detail with reference to FIG. 5. Accordingly, hereafter, the process of the step S21 and the processes of the steps S91 to S95 will be described in detail.

In this embodiment, an FC start flag indicative of whether the fuel cell system 20 has started or not is used. At the time when a start key of the vehicle is switched to ON to start the electric power supply system 100, the fuel cell system 20 is in a stationary state, so that the FC start flag is initially set to "0."

In the step S91, the controller 30 acquires the SOC of the battery 10.

In the step S92, the controller 30 determines whether or not the SOC of the battery 10 is larger than an FC start threshold Ts. The FC start threshold Ts is determined in advance so as to avoid a situation where the charging amount of the battery 10 becomes insufficient during the starting process of the fuel cell system 20.

In the step S93, when the SOC of the battery 10 is larger than the FC start threshold Ts, the controller 30 determines that it is not necessary to start the fuel cell system 20 and sets the FC start flag to "0." When the temperature Tb of the battery 10 exceeds the warming-up threshold Tt after the processes of the steps S10 and S20 are finished, the controller 30 returns to the process of the step S91.

In the step S21, when the temperature Tb of the battery 10 is equal to or less than the warming-up threshold Tt, the controller 30 determines whether or not the FC start flag indicates "1". That is, when it is determined that the warming-up of the battery 10 is required, the controller 30 determines whether or not it is necessary to start the fuel cell system 20.

When the FC start flag indicates "0," that is, when it is necessary to execute the starting process of the fuel cell system 20, the controller 30 proceeds to the process of the step S94. Further, when the SOC of the battery 10 is equal to or less than the FC start threshold Ts in the step S92, the controller 30 also proceeds to the process of the step S94.

In the step S94, the controller 30 sets the FC start flag to "1."

In the step S95, the controller 30 starts to operate the fuel cell system 20. Since the fuel cells 21 of the present embodiment are solid oxide fuel cells, the start of the fuel cell system 20 requires the warming-up process of increasing the temperature of the fuel cell system 20 to several hundred degrees Centigrade, e.g., about 700° C. For this purpose, when the controller 30 starts the fuel cell system 20, the controller 30 warms up the fuel cells 21.

In the step S21, when the FC start flag indicates "1," the controller 30 proceeds to the process of the step S30 and causes the battery 10 to discharge the electric power to the FC auxiliary machine 23 of the fuel cell system 20.

As described above, when the temperature Tb of the battery 10 is equal to or less than the warming-up threshold Tt, the controller 30 causes the battery 10 to discharge the electric power to the FC auxiliary machine 23 irrespective of the magnitude of the SOC of the battery 10. In a case where the battery 10 is discharged, when the FC start flag indicates "O" because the fuel cell system 20 is in the stationary state, the controller 30 starts the fuel cell system 20 so that the battery 10 can discharge the electric power to the FC auxiliary machine 23.

According to the second embodiment of the present invention, when the SOC representing the charging amount of the battery 10 is equal to or less than the predetermined FC start threshold Ts, the controller 30 starts the fuel cell system 20, as illustrated from the step S91 to the step S95 in FIG. 7. As illustrated in the steps S10 and S20, in a case where it is determined that the temperature Tb of the battery 10 is equal to or less than the warming-up threshold Tt, even when the SOC of the battery 10 is larger than the FC start threshold Ts, the controller 30 starts the fuel cell system 20.

Thus, when temperature of the battery 10 is equal to or less than the predetermined temperature, the controller 30 changes a start condition of the fuel cell system 20. As a result, a start timing of the fuel cell system 20 can be advanced, so that the warming-up of the fuel cell system 20 can be promoted and the response of the fuel cell system 20 can be improved.

Further, according to the present embodiment, the fuel cells 21 are constituted by solid oxide fuel cells, and as described in the step S95 in FIG. 7, when the fuel cell system 20 is started, the controller 30 warms up the solid oxide fuel cells.

It is necessary for the solid oxide fuel cells to increase their temperature to several hundred degrees Centigrade. It takes a specific time, e.g., dozens of minutes, to complete the warming-up of the solid oxide fuel cells. When the solid oxide fuel cells are used, it takes time to warm up the fuel cells 21 and the response of the fuel cells 21 deteriorates. On the contrary, heat retention measures are provided to the solid oxide fuel cells so as to restrain a decrease in the temperature of the solid oxide fuel cells. As a result the solid oxide fuel cells have a property that their temperature is hard to decrease after the warming-up of the fuel cells 21 is completed.

When the fuel cells 21 are constituted by the solid oxide fuel cells, the warming-up of the fuel cells 21 is performed prior to a power generation request of the fuel cells 21 based on the battery SOC on the occasion when the warming-up of the battery 10 is required. This makes it possible to improve the response of the fuel cells 21 at an early stage. Further, once the warming-up of the fuel cells 21 is completed, the temperature of the fuel cells 21 is hard to decrease. Accordingly, it is possible to suppress an increase in the consuming amount of the fuel necessary to maintain the temperature of the fuel cells 21.

According to the present embodiment, therefore, by constituting the fuel cells 21 by the solid oxide fuel cells, the response of the fuel cell system 20 can be improved while suppressing an the fuel consumption of the fuel cell system 20.

Third Embodiment

Figure 8:
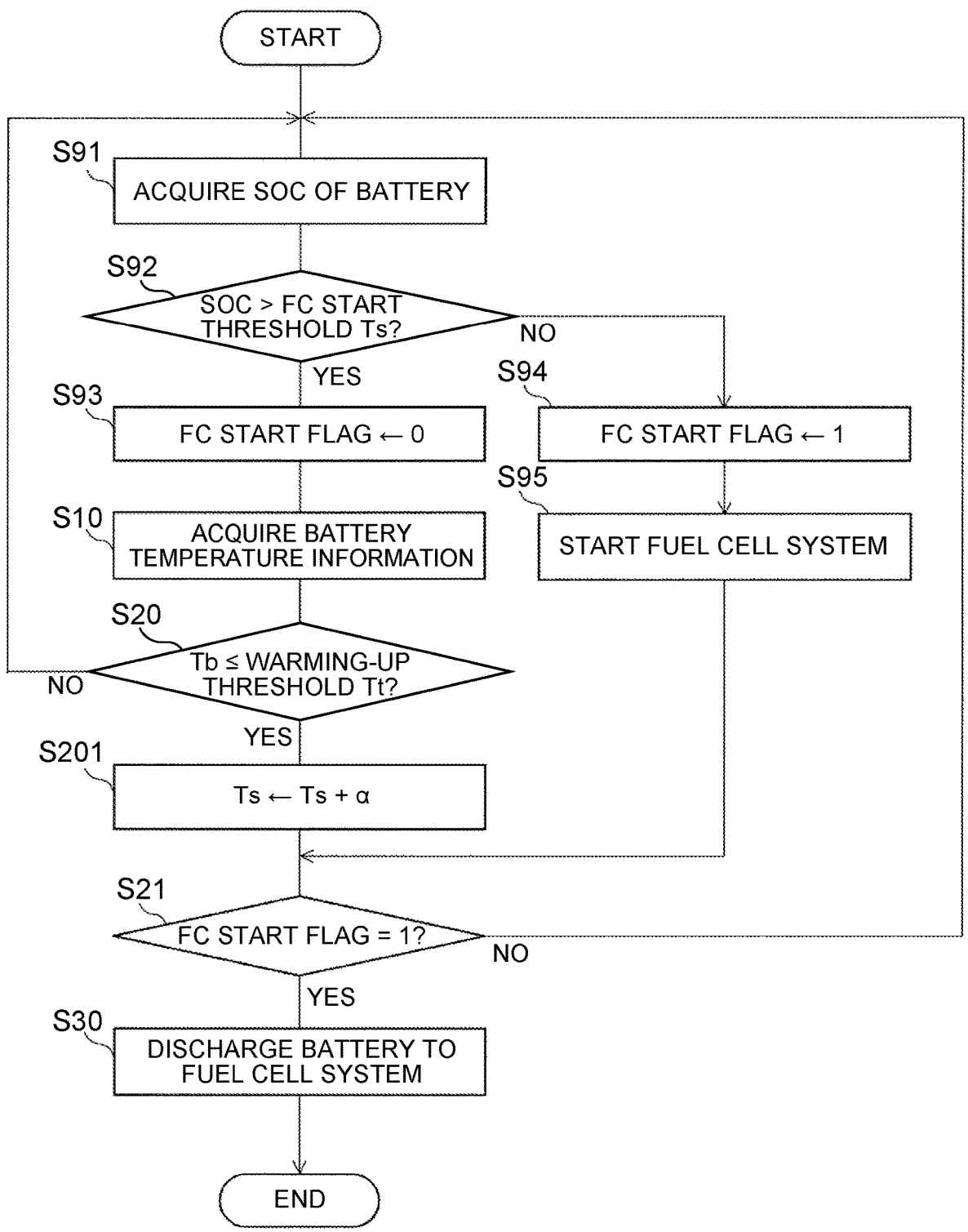
FIG. 8 is a flowchart illustrating a control process of the electric power supply system according to a third embodiment of the present invention.

FIG. 8 is a flowchart illustrating a control process of the electric power supply system 100 according to the third embodiment of the present invention.

The process procedure related to the control method of the present embodiment includes a process of step S201 in addition to the processes illustrated in FIG. 7. Accordingly, hereafter, the process of the step S201 will be described in detail.

When it is determined that the temperature Tb of the battery 10 is equal to or less than the warming-up threshold Tt in the step S20, the controller 30 sets, as the FC start threshold Ts, a value obtained by adding a positive value α to the FC start threshold Ts in the step S201

That is, when it is determined that the temperature Tb of the battery 10 is equal to or less than the warming-up threshold Tt, the controller 30 changes the FC start threshold Ts to a specific threshold larger than a predetermined threshold used when the temperature Tb of the battery 10 is larger than the warming-up threshold Tt.

The aforementioned positive value α may be a value determined in advance or may be changed in accordance with the temperature Tb of the battery 10 or the fuel residual amount of the fuel cells 21. For example, as a difference between the temperature Tb of the battery 10 and the warming-up threshold Tt is larger, it takes a longer time to warm up the battery 10. Accordingly, the positive value α is set to a large value so that the warming-up of the battery 10 is completed at an early stage. Alternatively, as the fuel residual amount of the fuel cells 21 is larger, the number of opportunities to start the fuel cells 21 increases. In this context, the positive value α is set to a large value when the fuel residual amount of the fuel cells 21 is large so that the response of the fuel cells 21 is improved.

Then, the controller 30 proceeds to the process of the step S21, and if the FC start flag is "0," the controller 30 returns to the process of the step S91. Since the FC start threshold Ts is set to a larger value than that in a case where the temperature Tb of the battery 10 is larger than the warming-up threshold Tt, so that the fuel cell system 20 can be started to operate earlier.

As described above, according to the third embodiment of the present invention, when it is determined that the temperature of the battery 10 is equal to or less than the predetermined temperature, the controller 30 increases the FC start threshold Ts by the positive value α in the step S201 in FIG. 8.

That is, the controller 30 changes the FC start threshold Ts that is the start condition of the fuel cell system 20 from the predetermined threshold used when the temperature of the battery 10 is larger than the predetermined temperature to the specific threshold larger than the predetermined threshold by the positive value a. Hereby, the fuel cell system 20 can be started earlier when the warming-up of the battery 10 is required, so that the battery 10 and the fuel cell system 20 can be both warmed up at an early stage.

Fourth Embodiment

Figure 9:
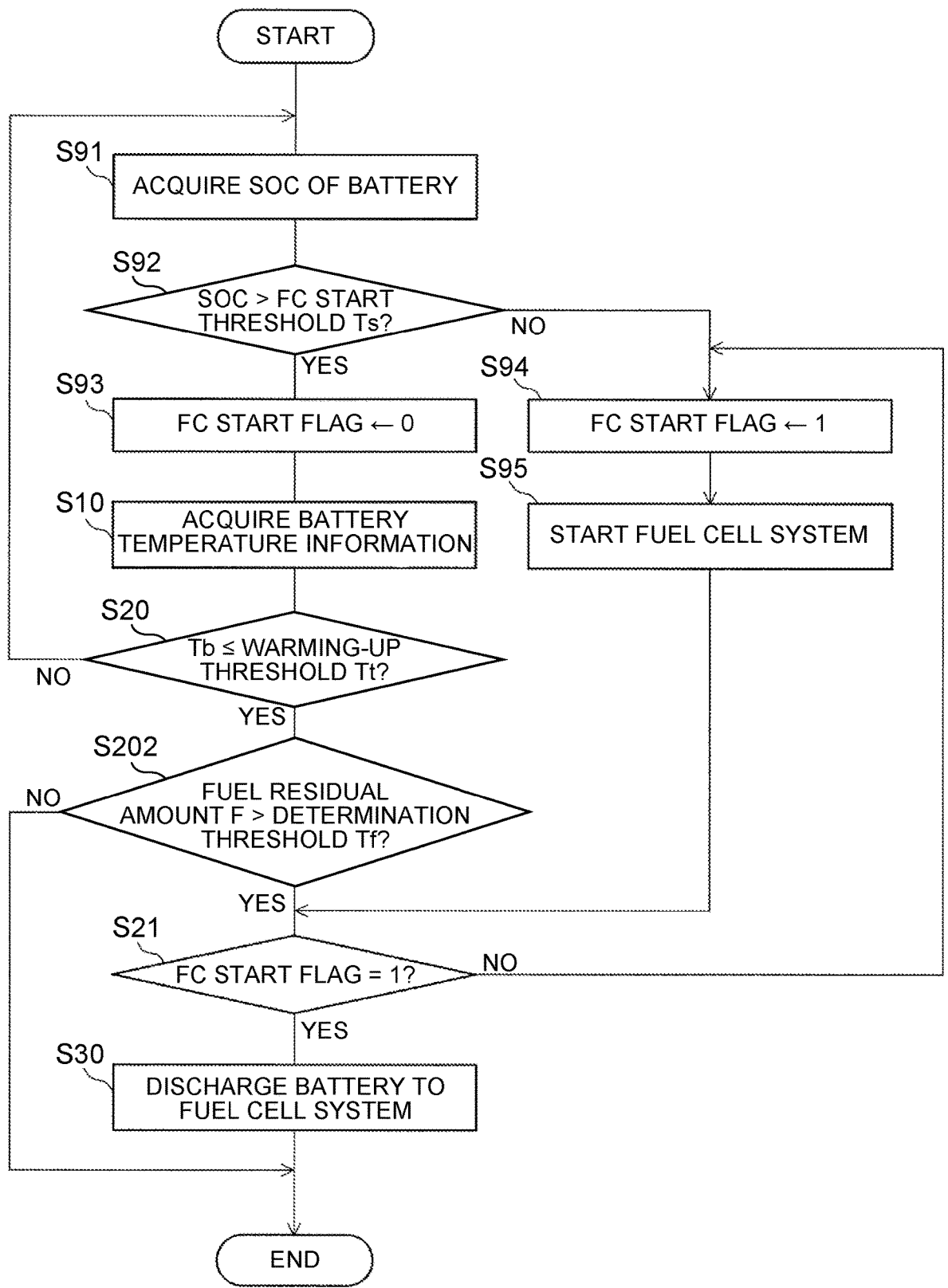
FIG. 9 is a flowchart illustrating a control process of the electric power supply system according to a fourth embodiment of the present invention.

FIG. 9 is a flowchart illustrating a control process of the electric power supply system 100 according to the fourth embodiment of the present invention.

The control process according to the present embodiment includes a process of a step S202 in addition to the processes illustrated in FIG. 7. Accordingly, hereafter, the process of the step S202 will be described in detail.

In the step S202, when it is determined that the temperature Tb of the battery 10 is equal to or less than the warming-up threshold Tt, the controller 30 determines whether or not a fuel residual amount F indicative of the residual amount of the fuel to be supplied to the fuel cells 21 is larger than a determination threshold Tf.

The determination threshold Tf is determined in advance based on the fuel consumption required for the operation start of the fuel cell system 20, for example. Alternatively, as a difference between the temperature Tb of the battery 10 and the warming-up threshold Tt is larger, the fuel consumption required for the warming-up of the fuel cells 21 increases. Accordingly, as the difference between the temperature Tb of the battery 10 and the warming-up threshold Tt is larger, the controller 30 may set the determination threshold Tf to a larger value. This makes it possible to prevent wasteful execution of the starting process of the fuel cell system 20.

As the aforementioned fuel residual amount F, a detection value of the fuel residual amount sensor 212 may be used. Alternatively, the fuel residual amount F may be calculated by accumulating the consuming amount of the fuel that is calculated based on a target current or a detection current of the fuel cells 21. The target current of the fuel cells 21 is calculated, for example, based on a value obtained by subtracting dischargeable power of the battery 10 from requested power of the aforementioned electric load device 90.

When the fuel residual amount F is larger than the determination threshold Tf, the controller 30 determines that the generated power of the fuel cells 21 can be supplied to the electric load device 90 and proceeds to the process of the step S94 so as to execute the starting process of the fuel cell system 20.

In the meantime, when the fuel residual amount F is equal to or less than the determination threshold Tf, the controller 30 finishes the control process for the electric power supply system 100 without starting the fuel cell system 20.

As described above, when the fuel residual amount F is equal to or less than the determination threshold Tf, the electric power that can be supplied from the fuel cells 21 is small, so that the controller 30 prevents from starting the fuel cell system 20 to operate.

According to the fourth embodiment of the present invention, when the fuel residual amount F exceeds the determination threshold Tf as described with respect to the step S202 in FIG. 9, at the time when it is determined that the temperature of the battery 10 is equal to or less than the predetermined temperature, the controller 30 starts the fuel cell system 20 to operate.

Generally, as the fuel residual amount F increases, the number of opportunities to supply power from the fuel cells 21 to the electric load device 90 increases. Accordingly, when the fuel cell system 20 is started to operate at the time when the fuel residual amount F exceeds the determination threshold Tf, it is possible to prevent such a situation that the operation of the fuel cell system 20 is stopped without outputting the electric power. As a result, it is possible to prevent wasteful execution of the starting process of the fuel cell system 20.

According to the present embodiment, the determination as to whether or not the start of the fuel cell system 20 is required is performed based on the fuel residual amount F, but the determination may be performed based on a parameter related to the power generation of the fuel cells 21.

For example, when the detection value of the FC temperature sensor 211 as the parameter related to the power generation of the fuel cells 21 is not more than a specific value smaller than the warming-up threshold Tt, the controller 30 may prevent the operation start of the fuel cell system 20. This makes it possible to prevent such a situation that the fuel efficiency of the fuel cell system 20 worsens due to an excessive increase in the fuel consumption required for the warming-up of the fuel cells 21.

Alternatively, when a parameter such as the required electric power of the electric load device 90, the detection value of the accelerator sensor 911, or the detection value of the vehicle speed sensor 913 exceeds a specific value, or when the detection value of the brake sensor 912 is below a specific value, the electric power is likely to be supplied from the fuel cells 21 to the electric load device 90. It is possible that, when any of the aforementioned parameter related to the power generation of the fuel cells 21 exceeds the specific value, the controller 30 may execute the starting process of the fuel cell system 20, because it is likely to receive a power generation request of the fuel cells 21 in such a case.

Thus, according to the present embodiment, the fuel cell system 20 is started based on the parameter related to the power generation of the fuel cells 21. Hereby, it is possible to prevent wasteful execution of the starting process of the fuel cell system 20, thereby making it possible to improve the fuel efficiency of the fuel cell system 20.

It should be noted that, according to the present embodiment, the process of the step S202 is added as illustrated in FIG. 9, but the process of the step S201 illustrated in FIG. 8 may be added between the step S20 and the step S202 or between the step S202 and the step S21. Even in such a case, it is possible to obtain the effects of both the third embodiment and the fourth embodiment.

Fifth Embodiment

Figure 10:
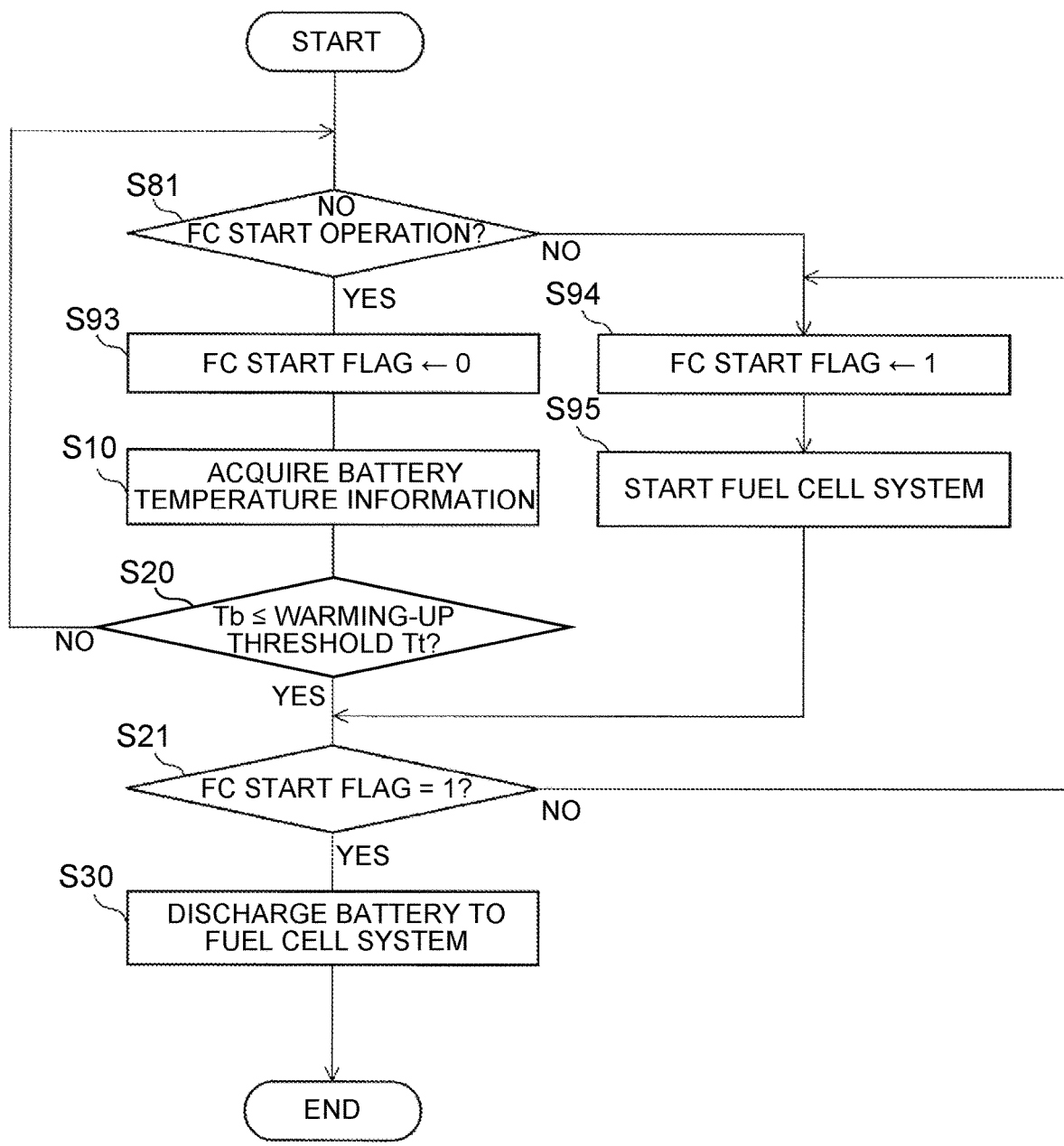
FIG. 10 is a flowchart illustrating a control process of the electric power supply system according to a fifth embodiment of the present invention.

FIG. 10 is a flowchart illustrating a control process of the electric power supply system 100 according to the fifth embodiment of the present invention.

The control process according to the present embodiment includes a process of a step S81 instead of the processes of steps S91 and S92 illustrated in FIG. 7. Accordingly, hereafter, the process of the step S81 will be described in detail.

In the step S81, the controller 30 determines whether or not the controller 30 receives a start operation signal to instruct the operation start of the fuel cell system 20 from the FC operation button 200. When the controller 30 has not received the start operation signal, the controller 30 proceeds to the process of the step S93, and when the controller 30 has received the start operation signal, the controller 30 proceeds to the process of the step S94.

Thus, according to the present embodiment, the controller 30 determines whether or not the start of the fuel cell system 20 is required, based on whether the controller 30 has received the start operation signal output from the FC operation button 200. When it is determined that the temperature Tb of the battery 10 is equal to or less than the warming-up threshold Tt, the controller 30 executes the starting process of the fuel cell system 20 regardless of whether the controller 30 receives the start operation signal or not.

Hereby, similarly to the second embodiment, by causing the battery 10 to discharge the electric power to the FC auxiliary machine 23 of the fuel cell system 20, it is possible to complete the warming-up of both the battery 10 and the fuel cell system 20 at an early stage.

The present embodiment describes an example in which the steps S91 and S92 illustrated in FIG. 7 are replaced by the step S81, but it is also possible to supplement the step S81 after the step S92 in FIGS. 7 to 9.

The embodiments of the present invention have been described above, but the embodiments just show some applications of the present invention and are not intended to limit the technical scope of the present invention to the concrete configurations of the embodiments.

For example, in the above embodiments, a blower or a compressor that supplies the air to the fuel cells 21 is employed as the FC auxiliary machine 23, but the present invention is not limited to this. For example, the FC auxiliary machine 23 may be a blower that supplies ethanol or the like used for power generation of a solid oxide fuel cell or may be a pump that supplies refrigerant to the fuel cells 21. Even with such a device, it is possible to obtain the same effect as the above embodiments.

Note that the above embodiments can be combined appropriately.

The invention claimed is:

1. A control method for a power supply system that supplies an electric power to an electric load, the system comprising a battery that generates heat by discharging the electric power and a fuel cell system that generates the electric power by solid oxide fuel cells, the method comprising:
   determining whether or not a temperature of the battery is equal to or less than a predetermined temperature; and
   discharging the battery to the fuel cell system when the temperature of the battery is equal to or less than the predetermined temperature,
   wherein the method further comprises:
   starting the fuel cell system to operate when a charging amount of the battery is equal to or less than a predetermined threshold; and
   changing a condition of the starting the fuel cell system to operate when temperature of the battery is equal to or less than the predetermined temperature, wherein
   the discharging the battery to the fuel cell system includes discharging the battery to an auxiliary machine provided in the fuel cell system, when the fuel cell system is started to operate.

2. The control method according to claim 1, wherein
   the changing the start condition when the temperature of the battery is equal to or less than the predetermined temperature includes changing the predetermined threshold to a specific threshold that is greater than the predetermined threshold.

3. The control method according to claim 1, wherein
   the changing the start condition when the temperature of the battery is equal to or less than the predetermined temperature includes starting the fuel cell system to operate in accordance with a parameter related to power generation of the fuel cells regardless of the charging amount of the battery.

4. The control method according to claim 1, further comprising:
   starting the fuel cell system to operate based on an operation by a user; and
   starting the fuel cell system regardless of the operation by the user, when the temperature oft the battery is equal to or less than the predetermined temperature.

5. The control method according to claim 1, further comprising:
   warming up the solid oxide fuel cells when the fuel cell system is started to operate.

6. The control method according to claim 1, further comprising:
   supplying the electric power to the auxiliary machine from an auxiliary battery which is different from the battery, when the temperature of the battery is higher than the predetermined temperature.

7. A control device for a power supply system that supplies an electric power to an electric load, the system comprising a battery that generates heat by discharging the electric power and a fuel cell system that generates the electric power by solid oxide fuel cells, the device comprising:
   a programmable controller programmed to:

determine whether or not a temperature of the battery is equal to or less than a predetermined temperature; and discharge the battery to the fuel cell system when the temperature of the battery is equal to or less than the predetermined temperature, wherein the controller is further programmed to:

start the fuel cell system to operate when a charging amount of the battery is equal to or less than a predetermined threshold;

change a condition of the starting the fuel cell system to operate when the temperature of the battery is equal to or less than the predetermined temperature, and discharge the battery to an auxiliary machine provided in the fuel cell system, when discharging the battery to the fuel cell system.

* * * * *